US009155387B2

(12) United States Patent
Kaluzavich et al.

(10) Patent No.: US 9,155,387 B2
(45) Date of Patent: Oct. 13, 2015

(54) SYSTEM AND DEVICE FOR PREVENTING CORROSION ON SHELVING CORNER POSTS

(75) Inventors: Robert P. Kaluzavich, Kingston, PA (US); Michael A. Ward, Harveys Lake, PA (US); David Barsigian, Old Forge, PA (US)

(73) Assignee: Metro Industries Inc., Reno, NV (US)

( * ) Notice: Subject to any disclaimer, the term of this patent is extended or adjusted under 35 U.S.C. 154(b) by 0 days.

(21) Appl. No.: 13/055,795

(22) PCT Filed: Jul. 21, 2009

(86) PCT No.: PCT/US2009/051234
§ 371 (c)(1),
(2), (4) Date: Apr. 13, 2011

(87) PCT Pub. No.: WO2010/011638
PCT Pub. Date: Jan. 28, 2010

(65) Prior Publication Data
US 2011/0180503 A1    Jul. 28, 2011

Related U.S. Application Data

(60) Provisional application No. 61/083,637, filed on Jul. 25, 2008.

(51) Int. Cl.
*A47B 91/12* (2006.01)
*A47B 91/02* (2006.01)
(Continued)

(52) U.S. Cl.
CPC ................. *A47B 91/12* (2013.01); *A47B 57/00* (2013.01); *A47B 91/02* (2013.01); *A47B 97/00* (2013.01);
(Continued)

(58) Field of Classification Search
CPC .......... E02D 5/60; A47B 57/00; A47B 91/02; A47B 91/12; A61H 3/02; A47C 31/00; E04H 12/2292
USPC ........ 248/345, 345.1, 188.4, 188.9, 545, 650, 248/680, 85, 156, 530; 405/216, 211.1; 52/126.4, 291, 295, 296, 297, 298, 704
See application file for complete search history.

(56) References Cited

U.S. PATENT DOCUMENTS 70,490 A * 11/1867 Winchester ................ 248/188.9
753,709 A *  3/1904 Jones .............................. 52/297
(Continued)

FOREIGN PATENT DOCUMENTS

CN        2056329       4/1990

OTHER PUBLICATIONS

Chinese Office Action issued Mar. 8, 2013, in Chinese Patent Application No. 200980129080.8.
(Continued)

*Primary Examiner* — Terrell McKinnon
*Assistant Examiner* — Eret McNichols
(74) *Attorney, Agent, or Firm* — Fitzpatrick, Cella, Harper & Scinto

(57) ABSTRACT

An anti-corrosion support device includes a post and a post protector that is disposed about a bottom portion of the post. An interior surface of the post protector is sized and shaped to fit tightly over an exterior surface of the bottom portion of the post. The anti-corrosion support device also may include an adjustment foot that passes through an aperture formed through a bottom portion of the post protector into an attachment member mounted to the post. An anti-corrosion support system includes several of the anti-corrosion support devices, shelf supporting means, and one or more shelves.

15 Claims, 8 Drawing Sheets

(51) Int. Cl.
| | |
|---|---|
| *A47B 57/00* | (2006.01) |
| *E04H 12/22* | (2006.01) |
| *E02D 5/60* | (2006.01) |
| *A61H 3/02* | (2006.01) |
| *A47B 97/00* | (2006.01) |
| *A47C 31/00* | (2006.01) |
| *B65G 1/02* | (2006.01) |

(52) U.S. Cl.
CPC .. *A61H 3/02* (2013.01); *E02D 5/60* (2013.01); *E04H 12/2292* (2013.01); *A47C 31/00* (2013.01); *B65G 1/02* (2013.01); *B65G 2207/40* (2013.01)

(56) References Cited

U.S. PATENT DOCUMENTS

| | | | | |
|---|---|---|---|---|
| 2,103,095 | A * | 12/1937 | Schermerhorn | 248/188.9 |
| 2,210,441 | A * | 8/1940 | Bachman | 52/297 |
| 2,454,739 | A * | 11/1948 | Hendrickson | 16/30 |
| 3,104,493 | A * | 9/1963 | Nalle | 248/188.4 |
| 3,232,253 | A * | 2/1966 | Winters | 297/344.12 |
| 3,424,111 | A | 1/1969 | Maslow | 108/147.13 |
| 3,612,287 | A * | 10/1971 | Maltese | 52/298 |
| 3,757,705 | A * | 9/1973 | Maslow | 108/147.13 |
| 3,823,785 | A * | 7/1974 | Toliver | 173/90 |
| 3,851,483 | A * | 12/1974 | Holley, Jr. | 405/232 |
| 4,010,922 | A | 3/1977 | Heller et al. | 248/165 |
| 4,240,766 | A * | 12/1980 | Smith et al. | 404/10 |
| 4,412,667 | A | 11/1983 | Doerner | 248/188.7 |
| 4,799,818 | A | 1/1989 | Sudimak et al. | 403/107 |
| 5,369,925 | A | 12/1994 | Vargo | 52/244 |
| 5,390,803 | A * | 2/1995 | McAllister | 211/153 |
| D373,721 | S * | 9/1996 | Panow | D8/402 |
| 5,603,140 | A * | 2/1997 | Pryce | 16/18 CG |
| 5,666,774 | A * | 9/1997 | Commins | 52/298 |
| 6,241,108 | B1 * | 6/2001 | Nakatani et al. | 211/187 |
| 6,327,985 | B1 * | 12/2001 | Frenkler et al. | 108/147.19 |
| 6,353,951 | B1 | 3/2002 | Gramling | 5/663 |
| 6,354,231 | B1 * | 3/2002 | Morris | 108/144.11 |
| 6,494,640 | B2 | 12/2002 | Roller | 404/6 |
| 6,647,589 | B1 * | 11/2003 | Youngwith | 16/18 CG |
| 6,672,017 | B2 * | 1/2004 | Larson | 52/170 |
| 6,695,156 | B1 * | 2/2004 | Wang | 211/187 |
| 6,748,878 | B2 * | 6/2004 | Chen | 108/147.13 |
| 6,941,710 | B2 * | 9/2005 | Eden | 52/170 |
| 7,124,986 | B1 * | 10/2006 | Bailey | 248/188.9 |
| 7,150,579 | B2 * | 12/2006 | Newton | 404/11 |
| 7,296,386 | B2 * | 11/2007 | Leek | 52/296 |
| 7,407,444 | B2 * | 8/2008 | Cera | 473/300 |
| 7,437,857 | B1 * | 10/2008 | Maguire et al. | 52/298 |
| 7,513,083 | B2 * | 4/2009 | Pryor et al. | 52/167.4 |
| 8,181,923 | B2 * | 5/2012 | Verdelli, Jr. | 248/188.9 |
| 8,555,907 | B2 * | 10/2013 | Kutz | 135/77 |
| 8,782,978 | B1 * | 7/2014 | Frenette et al. | 52/296 |
| 2002/0094239 | A1 * | 7/2002 | Bradley et al. | 405/216 |
| 2003/0143037 | A1 * | 7/2003 | Ashton et al. | 405/250 |
| 2005/0076445 | A1 * | 4/2005 | MacEachern | 5/663 |
| 2006/0038163 | A1 | 2/2006 | Ricci | 256/1 |
| 2007/0219013 | A1 * | 9/2007 | Merriman | 473/286 |
| 2008/0230174 | A1 * | 9/2008 | Huang | 156/187 |
| 2008/0258023 | A1 * | 10/2008 | Desmarais | 248/188.9 |
| 2012/0097818 | A1 * | 4/2012 | Desmarais | 248/345.1 |
| 2013/0019410 | A1 * | 1/2013 | Willis | 5/663 |

OTHER PUBLICATIONS

Chinese Office Action issued Jun. 3, 2014, in Chinese Patent Application No. 200980129080.8.

* cited by examiner

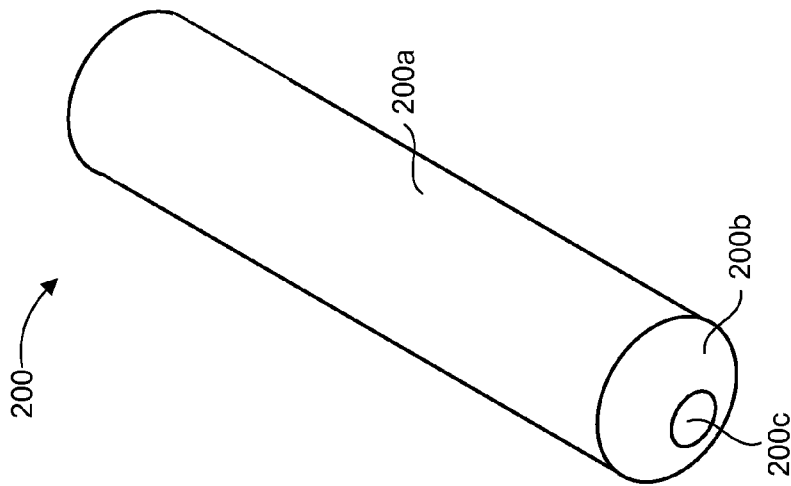
FIG. 2D
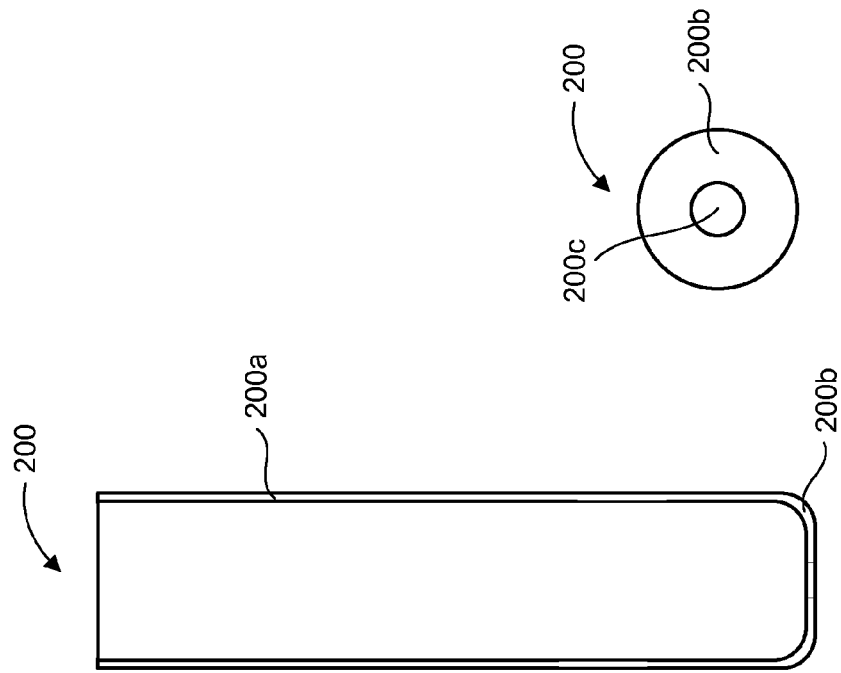
FIG. 2C
FIG. 2B
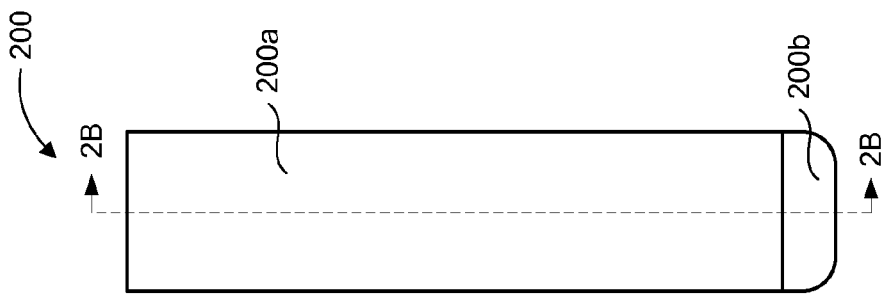
FIG. 2A

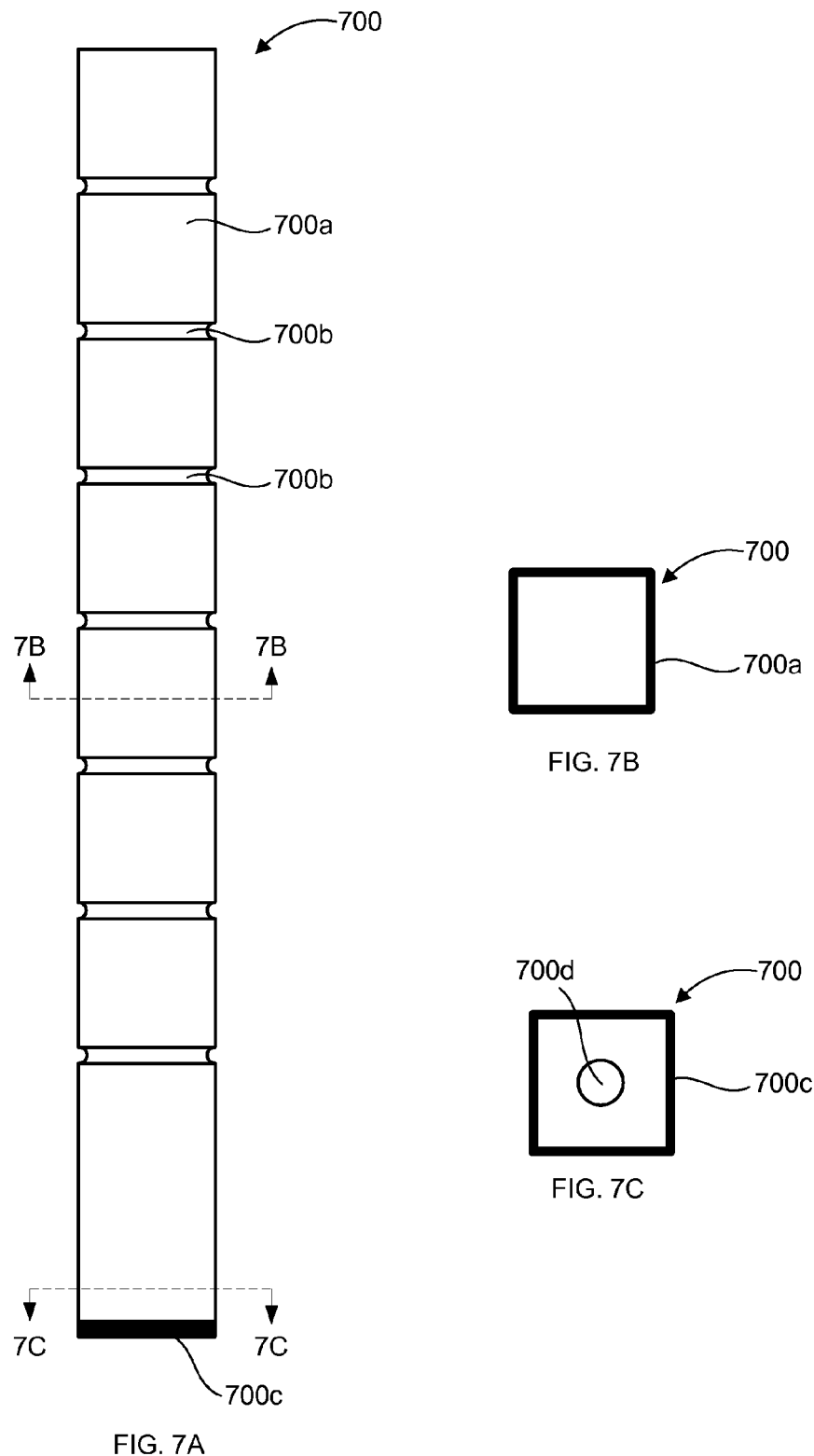

SYSTEM AND DEVICE FOR PREVENTING CORROSION ON SHELVING CORNER POSTS

BACKGROUND OF THE INVENTION

1. Field of the Invention

The present invention relates generally to support structures that can be used to carry or support desired items. More particularly, the present invention relates to an anti-corrosion device and system for supporting items.

2. Description of Related Art

Various shelving systems are known in the art. Just as examples, each of U.S. Pat. No. 3,424,111 (Maslow); U.S. Pat. No. 3,757,705 (Maslow); and U.S. Pat. No. 4,799,818 (Sudimak et al.) disclose shelving systems having a plurality of corner posts, sleeves mountable on each corner post, and collars associated with a shelf that mate with a sleeve in turn mounted on a post. In this way, the shelf can be mounted on the posts. The disclosure of each of these patents is incorporated herein in its entirety by reference.

Shelving systems such as those described above may be used for numerous applications in many different environments, including corrosive environments. Exemplary corrosive environments include coolers, kitchens, laboratories, and the like. Some shelving systems are substantially corrosion-proof; however, others are merely corrosion-resistant. When corrosion-resistant shelving systems are used in wet or otherwise corrosive environments, corrosion is delayed rather than prevented. In some cases, bottom portions of corner posts of these shelving systems develop significant corrosion, which may be caused by washing of floors that support the corner posts, for example. Conventionally, only corrosion-proof corner posts have been used in these corrosive environments.

For these and other reasons, the shelving devices and systems of the prior art are not entirely satisfactory. A need exists for an improved shelving device and system in which corrosion of corner posts is substantially prevented.

SUMMARY OF THE INVENTION

It is an object of the present invention to provide a support device and a support system that substantially prevents corrosion of corner posts.

It is another object of the present invention to provide a support device and a support system that substantially prevents damage to bottom portions of corner posts caused by cleaning and other equipment.

Post protectors provide a simple and effective way to combat corrosion of bottom portions of corner posts. Dimensions of interior portions of the post protectors are designed to match dimensions of exterior portions of the corner posts such that the post protectors fit tightly over the corner posts, which effectively excludes water and chemicals from coming into contact with vulnerable bottom portions of the posts.

Post protectors are formed from a resilient elastomeric material that allows the post protectors to fit tightly around the corner posts, which may vary slightly in size and shape. In addition, because they are formed from a resilient material, post protectors protect the corner posts from abrasion and impact damage caused by floor cleaning tools, such as mops and brooms, for example.

A corner post may include an adjustable foot that can be adjusted to compensate for uneven floor surfaces. To accommodate such a corner post, the bottom portion of the post protector may include a hole through which the adjustable foot can pass.

Accordingly, in one aspect, the present invention is directed to an anti-corrosion support device that includes a post, and a post protector disposed about a bottom portion of the post. An interior surface of the post protector is sized and shaped to fit tightly over an exterior surface of the bottom of the post.

In another aspect, the present invention is directed to an anti-corrosion support system including a plurality of posts, and a plurality of post protectors. Each of the post protectors is disposed about a bottom portion of a different one of the posts with the interior surface of each protector sized and shaped to fit tightly over the exterior surface of the bottom portion of one post. Support structures for supporting a shelf are mountable on the posts, and at least one shelf is supported on the support structures.

In yet another aspect, the present invention is directed to an anti-corrosion protector for a support post having an exterior surface. The protector includes a main body having an interior surface sized and shaped to fit tightly over the exterior surface of at least a bottom portion of the post, and a bottom formed with the main body to enclose a substantial portion of the bottom extreme of the post.

A more complete appreciation along with an understanding of other objects, features, and aspects of the present invention will become apparent from the following detailed description when considered in conjunction with the accompanying drawings.

BRIEF DESCRIPTION OF THE DRAWINGS

FIG. 2A is a front view of a post protector in accordance with an embodiment of the present invention.

FIG. 2B is a vertical cross-sectional view of the post protector illustrated in FIG. 2A, taken along plane 2B-2B and looking in the direction of the arrows.

FIG. 2C is a bottom view of the post protector illustrated in FIG. 2A.

FIG. 2D is a perspective view of the post protector illustrated in FIG. 2A, taken from the bottom right.

FIG. 7A is a front view of a corner post in accordance with an embodiment of the present invention.

FIG. 7B is a horizontal cross-sectional view of the corner post illustrated in FIG. 7A, taken along plane 7B-7B and looking in the direction of the arrows FIG. 7C is a horizontal cross-sectional view of the corner post illustrated in FIG. 7A, taken along plane 7C-7C and looking in the direction of the arrows.

DETAILED DESCRIPTION OF THE INVENTION

Initially, the principal features of the present invention will be described generally in order to provide an overview of its various aspects. Then those features will be described in detail.

Figure 1A:
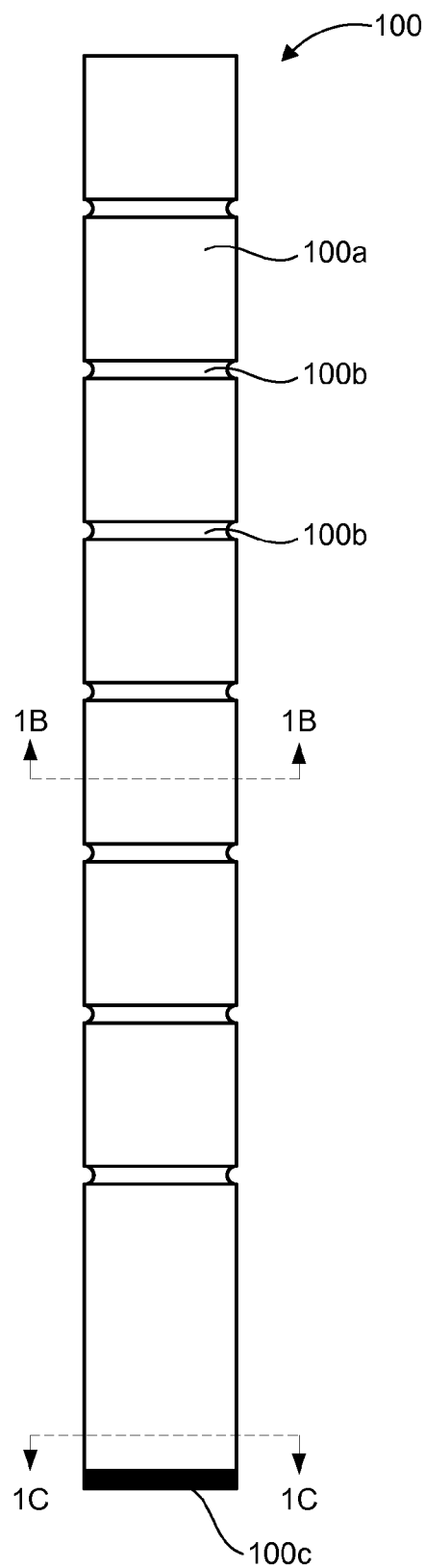
FIG. 1A is a front view of a corner post in accordance with an embodiment of the present invention.

FIG. 1A is a front view of an exemplary corner post 100 in accordance with an embodiment of the present invention. The corner post 100 includes a generally cylindrical body 100a having a plurality of annular notches 100b formed in the exterior surface. The notches 100b may receive a portion of a support collar 260 (shown in FIG. 5) that is used to support a shelf 270 (shown in FIG. 5) or other element for supporting items. The corner post 100 is typically made of cold-rolled steel.

Figure 1B:
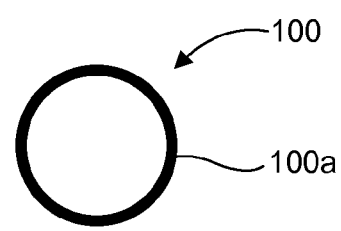
FIG. 1B is a horizontal cross-sectional view of the corner post illustrated in FIG. 1A, taken along plane 1B-1B and looking in the direction of the arrows.

FIG. 1B is a cross-sectional view of the corner post 100 illustrated in FIG. 1A, taken along plane 1B-1B and looking in the direction of the arrows. As shown in FIG. 1B, the corner post 100 has a circular cross-sectional area. Of course, other cross-sectional shapes are contemplated, such as rectangular, triangular, and irregular shapes, for example. The exemplary corner post 100 shown in FIG. 1B is hollow. However, in other embodiments of the present invention the post 100 may be solid.

Figure 1C:
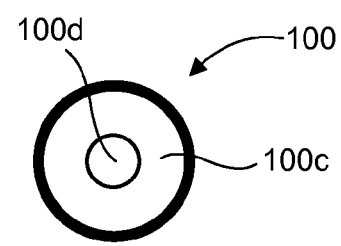
FIG. 1C is a horizontal cross-sectional view of the corner post illustrated in FIG. 1A, taken along plane 1C-1C and looking in the direction of the arrows.
Figure 3:
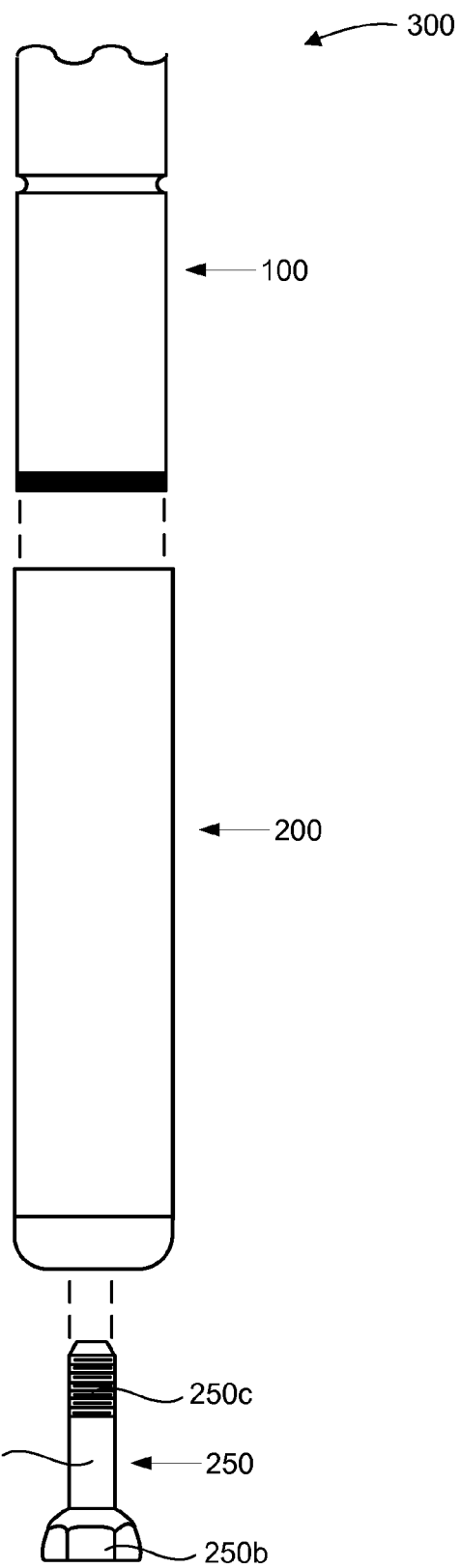
FIG. 3 illustrates assembly of an anti-corrosion support device according to an embodiment of the present invention.
Figure 6:
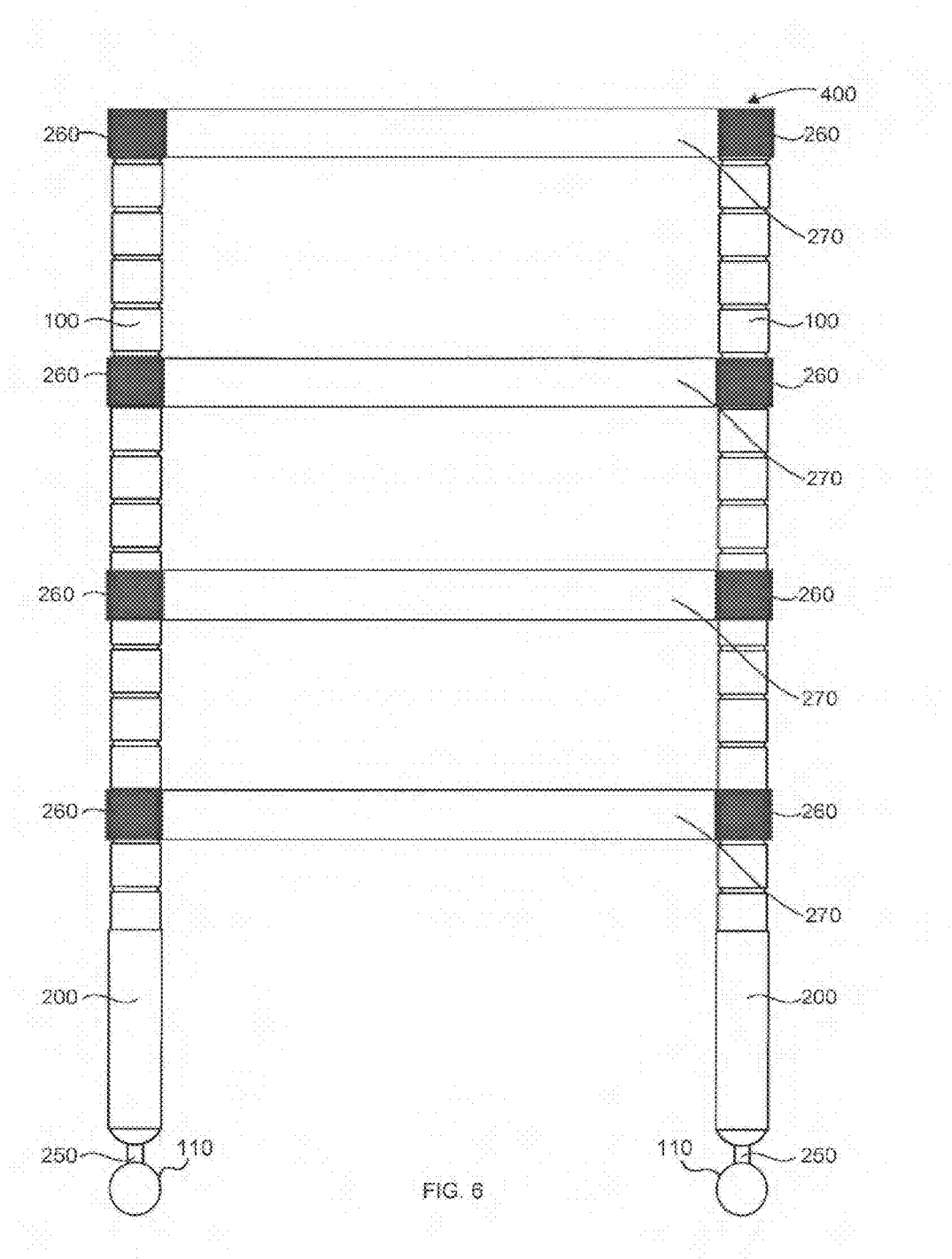
FIG. 6 is a front view of a corner post and wheel assembly in accordance with an embodiment of the present invention.

FIG. 1C is a cross-sectional view of the corner post 100 illustrated in FIG. 1A, taken along plane 1C-1C and looking in the direction of the arrows. The bottom portion of the corner post 100 includes an attachment member 100c that has an aperture 100d formed therethrough. The attachment member 100c includes a plurality of threads (not shown) disposed about the aperture 100d into which threads 250c of an adjustment foot 250 (shown in FIG. 3) may be advanced. The foot 250 may have an unthreaded shank 250a as shown in FIG. 3. The attachment member 100c may be in the form of a threaded insert 100e press fitted into the bottom of the post 100. It may alternatively be integrally formed with the corner post 100, or may be securely attached within an interior portion of the corner post 100 by welding, soldering, or other known techniques. In some embodiments, the attachment member 100c is used to attach a vertical post of a wheel assembly, such as a post of a caster or wheel assembly, for example. FIG. 6 is a front view of an anti-corrosion support system in accordance with an embodiment of the present invention and shows a wheel assembly 110 coupled to corner post 100.

FIG. 2A is a front view of a post protector 200 in accordance with an embodiment of the present invention. The post protector 200 includes a generally cylindrical main body 200a and a bulbous bottom portion 200b, which is nevertheless formed to fit tightly against the bottom of the post 100 and its mounted attachment member 100c. The bottom portion 200b includes an aperture 200c formed therethrough, as shown in FIG. 2C. The threads 250c of the adjustment foot 250 (shown in FIG. 3) may be passed through the aperture 200c to reach the threads (not shown) of the aperture 100d of the attachment member 100c shown in FIG. 1C. The diameter of aperture 200c should be closely matched to the diameter of the threaded portion 250c of the foot 250, and more particularly to the diameter of the shank 250a to limit passage of corrosive substances therebetween. For example, in the preferred embodiment the diameter of the aperture 200c is 0.365 inch, and the diameter of the threaded portion 250c and shank 250a is 0.375 inch.

The post protector is preferably made of a resilient elastomeric material such as PVC, by a process called vinyl dip molding. In particular, steel shafts (also called molds or mandrels) having the same nominal diameter as the post 100 are heated to required temperature then dipped into a tank of liquid vinyl material. Parts are dipped to desired depth or length of the protector for a length of time to achieve the required thickness. The protector is then lifted out of the liquid and placed in an oven to be heat cured. The protector is then stripped off of the mandel and placed onto a fixture for a secondary operation to punch the aperture in the bottom.

FIG. 2B is a cross-sectional view of the post protector 200 illustrated in FIG. 2A, taken along plane 2B-2B and looking in the direction of the arrows. As can be seen, the post protector 200 when cured is hollow and has a shape and dimensions that match closely the shape and dimensions of the main body 100a of the corner post 100, which is shown in FIG. 1A, again to limit intrusion of corrosive substances between the protector and post. For example, the post may have a nominal outer diameter of 1.0 inch and the protector may have a nominal inner diameter of slightly less than 1.0 inch, which results in a press fit between the protector and post when the two are assembled.

Figure 4:
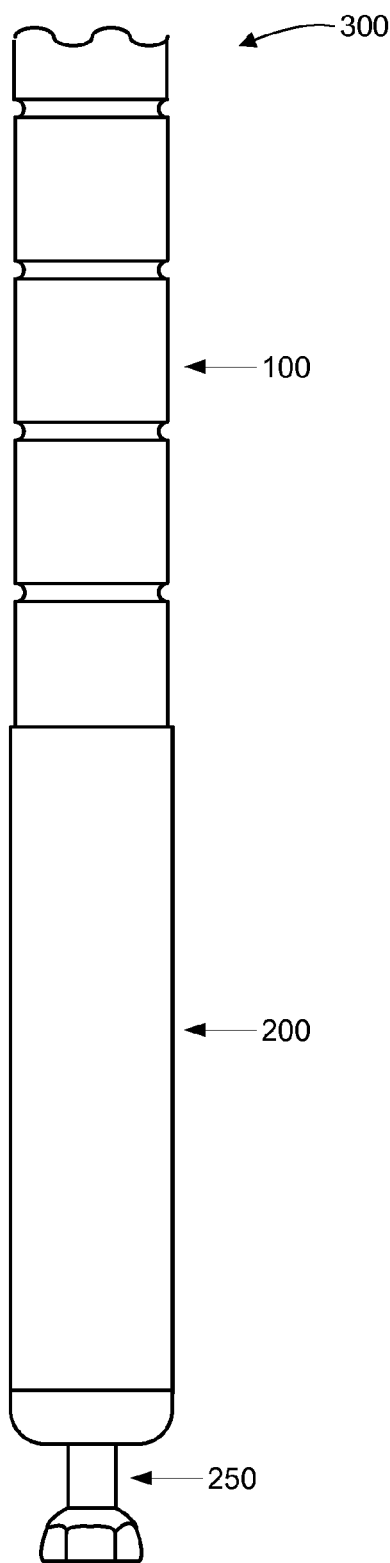
FIG. 4 illustrates an assembled anti-corrosion support device according to the embodiment shown in FIG. 3.

FIG. 3 illustrates assembly of an anti-corrosion support device 300 of the present invention. The top portion of the post protector 200 is aligned with the bottom portion of the corner post 100. The post protector 200 is advanced over the exterior surface of the corner post 100 until the bottom portion thereof contacts the bottom portion 200b of the post protector 200, as shown in FIG. 4. The length of the post protector 200 is selected based on the particular corrosive environment in which it will be used. For example, a post protector 200 having a length of six inches generally is sufficient to protect against corrosion caused by washing of floors that support the corner post 100.

Referring again to FIG. 3, the adjustment foot 250 includes a generally cylindrical main body 250a. A hex head 250b is formed at one end of the main body 250a, and threads 250c are formed at an opposite end of the main body 250a. The threads 250c are inserted through the aperture 200c of the post protector 200 into the aperture 100d of the attachment member 100c of the corner post 100. Clockwise rotation of the adjustment knob 250b causes the threads 250c to advance into the threads (not shown) of the attachment member 100c, which causes the main body 250a to advance into the interior portion of the corner post 100. Similarly, counter-clockwise rotation of the adjustment knob 250b causes the main body 250a to move out from within the interior portion of the corner post 100. In this manner, the adjustment knob 250b can be used to vary the effective length of the corner post 100 to compensate for uneven floor surfaces. Of course, other means may be employed to adjust the effective length of the corner post 100, including electric motors, hydraulic circuits, geared mechanisms, and the like.

Figure 5:
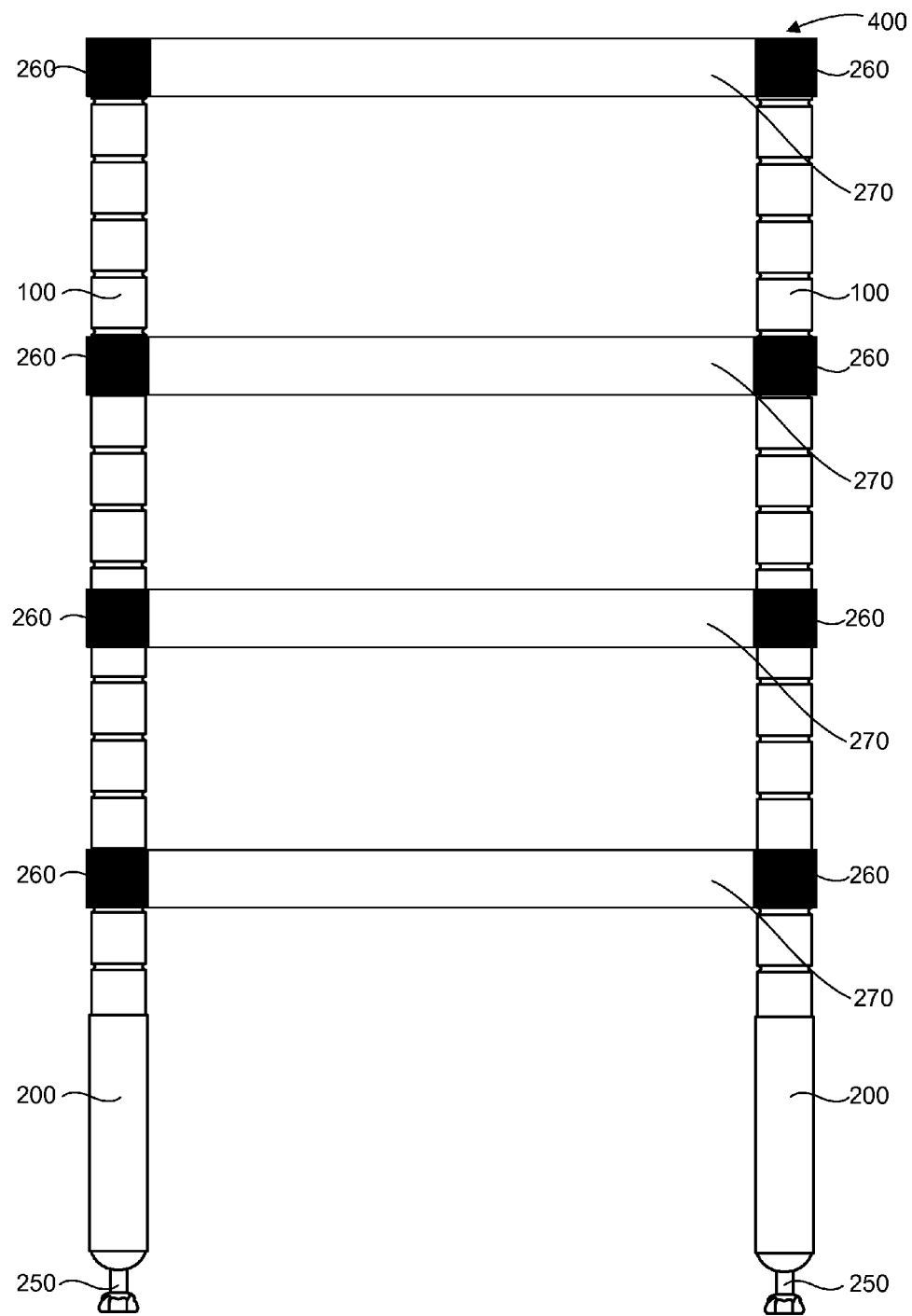
FIG. 5 is a front view of an anti-corrosion support system in accordance with an embodiment of the present invention.

FIG. 5 illustrates a front view of an anti-corrosion support system 400 according to an embodiment of the present invention, the basic structural components of which may be as described in the Maslow and Sudimak patents mentioned above, the entirety of which is incorporated herein by reference. The anti-corrosion shelving system 400 is constructed using a plurality of the anti-corrosion support devices 300, a plurality of shelf collars 260, and one or more shelves 270. In other embodiments of the anti-corrosion shelving system 400, one or more shelves 270 are attached directly to the plurality anti-corrosion support devices 300 using screws, nuts, bolts, welding, soldering, slots and grooves, or any other known technique for securely attaching objects together.

Figure 6A:
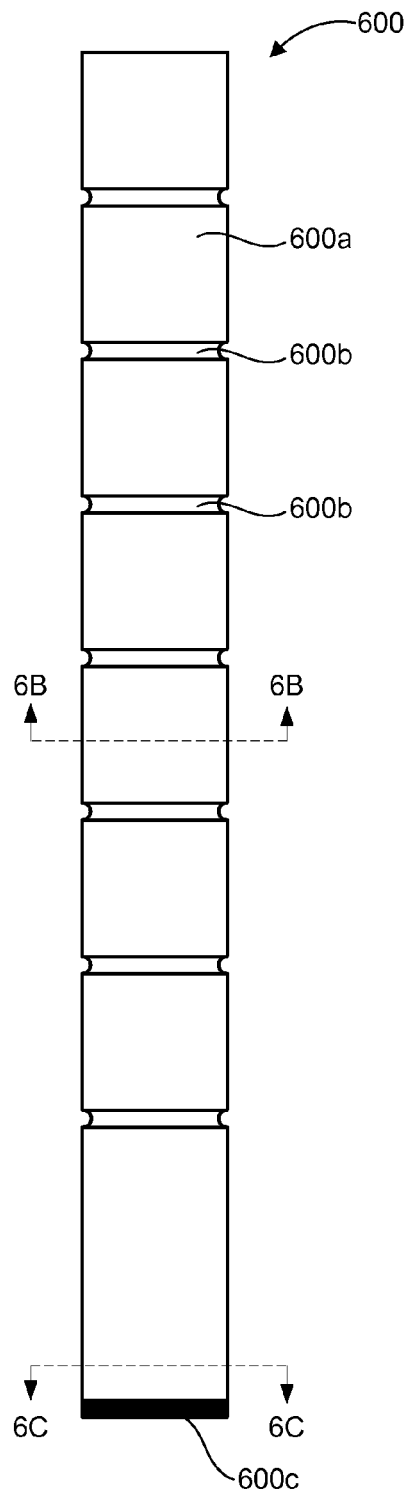
FIG. 6A is a front view of a corner post in accordance with an embodiment of the present invention.
Figure 6B:
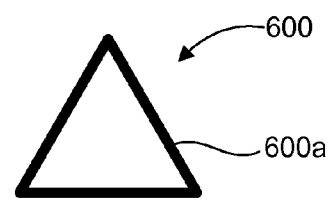
FIG. 6B is a horizontal cross-sectional view of the corner post illustrated in FIG. 6A, taken along plane 6B-6B and looking in the direction of the arrows

FIG. 6A is a front view of an exemplary corner post 600 in accordance with an embodiment of the present invention. The corner post 600 includes a generally triangular body 600a having a plurality of notches 600b formed in the exterior surface. FIG. 6B is a cross-sectional view of the corner post 600 illustrated in FIG. A, taken along plane 6B-6B and looking in the direction of the arrows. As shown in FIG. 6B, the corner post 600 has a triangular cross-sectional area.

Figure 6C:
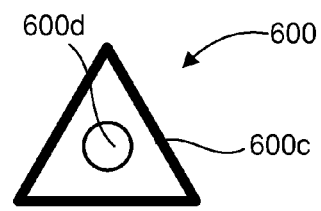
FIG. 6C is a horizontal cross-sectional view of the corner post illustrated in FIG. 6A, taken along plane 6C-6C and looking in the direction of the arrows.

FIG. 6C is a cross-sectional view of the corner post 600 illustrated in FIG. 6A, taken along plane 6C-6C and looking in the direction of the arrows.

FIG. 7A is a front view of an exemplary corner post 700 in accordance with an embodiment of the present invention. The corner post 700 includes a generally rectangular body 700a having a plurality of notches 700b formed in the exterior surface. FIG. 7B is a cross-sectional view of the corner post 700 illustrated in FIG. 7A, taken along plane 7B-7B and looking in the direction of the arrows. As shown in FIG. 7B, the corner post 700 has a rectangular cross-sectional area. FIG. 7C is a cross-sectional view of the corner post 700 illustrated in FIG. 7A, taken along plane 7C-7C and looking in the direction of the arrows.

While the present invention has been described with respect to what is presently considered to be the preferred embodiments, the present invention is not limited to the disclosed embodiments. Rather, the present invention covers various modifications and equivalent arrangements included within the spirit and scope of the appended claims. The scope of the appended claims is to be accorded the broadest interpretation so as to encompass all such modifications and equivalent structures and functions.

What is claimed is:

1. A support system comprising:
   a post comprising an attachment member having a plurality of threads formed therein;
   an adjustment foot attachable to support said post, said adjustment foot including (i) a shank and (ii) a threaded portion having a plurality of threads sized and shaped to be received by the plurality of threads of the attachment member; and
   an anti-corrosion post protector disposable about a bottom portion of said post, an interior surface of said post protector being sized and shaped to fit tightly over an exterior surface of the bottom portion of said post,
   wherein said post includes at least one of attaching means for attaching a shelf thereto and supporting means for supporting a shelf,
   wherein said post protector comprises an elastomeric material,
   wherein an aperture is formed in a bottom portion of said post protector through which the shank and threaded portion of said adjustment foot are disposed when said post protector is disposed about the bottom portion of said post and said adjustment foot is attached to the attachment member of said post,
   wherein the aperture of said post protector has a cross section with cross-sectional dimensions less than cross-sectional dimensions of the shank of said adjustment foot, and
   wherein when said post protector is disposed about the bottom portion of said post and said adjustment foot is attached to the attachment member of said post, the shank of said adjustment foot causes the cross-sectional dimensions of the aperture to increase to match the cross-sectional dimensions of the shank.

2. The support system according to claim 1, wherein the interior surface of said post protector is shaped and sized to establish a press fit with the exterior surface of the bottom portion of said post.

3. The support system according to claim 1, wherein said post protector and the bottom portion of said post have circular cross sections.

4. The support system according to claim 1, wherein said post protector and the bottom portion of said post have substantially triangular cross sections.

5. The support system according to claim 1, wherein said post protector and the bottom portion of said post have substantially rectangular cross sections.

6. The support system according to claim 1, wherein said post includes a groove for receiving a portion of a support collar.

7. An anti-corrosion support system, comprising:
   a plurality of posts, each comprising an attachment member having a plurality of threads formed therein;
   a plurality of adjustment feet, each being attachable to support one of said posts, and each including (i) a shank and (ii) a threaded portion having a threaded section sized and shaped to be received by the threads of one of the attachment members;
   a plurality of post protectors, each (i) comprising an elastomeric material and (ii) being disposable about a bottom portion of a different one of said posts;
   support means for supporting a shelf; and
   at least one shelf supportable by said support means,
   wherein an aperture is formed in a bottom portion of each post protector through which the shank of one of said adjustment feet is disposed when that post protector is disposed about the bottom portion of one of said posts and that adjustment foot is attached to the attachment member of that post,
   wherein each aperture has cross-sectional dimensions less than cross-sectional dimensions of the shanks of each of said adjustment feet,
   wherein when said post protectors are disposed about the bottom portions of said posts and said adjustment feet are attached to the attachment members of said posts, the shanks of said adjustment feet cause the cross-sectional dimensions of the apertures of said post protectors to increase to match the cross-sectional dimensions of the shanks, and
   wherein the interior surface of each post protector is sized and shaped to fit tightly over the exterior surface of the bottom portion of one of said plurality of posts.

8. The anti-corrosion support system according to claim 7, wherein the interior surface of each said post protector is shaped and sized to establish a press fit with the exterior surface of the bottom portion of one said post.

9. The anti-corrosion support system according to claim 7, wherein said plurality of post protectors and bottom portions of said plurality of posts have circular cross sections.

10. The anti-corrosion support system according to claim 7, wherein said plurality of post protectors and bottom portions of said plurality of posts have substantially triangular cross sections.

11. The anti-corrosion support system according to claim 7, wherein said plurality of post protectors and bottom portions of said plurality of posts have substantially rectangular cross sections.

12. The anti-corrosion support system according to claim 7, wherein each of said plurality of posts includes attaching means for attaching said support means thereto.

13. The anti-corrosion support system according to claim 7, wherein a plurality of shelves are supported by said support means.

14. The anti-corrosion support system according to claim 7, wherein said support means include a plurality of support collars.

15. The anti-corrosion support system according to claim 7, further comprising a plurality of wheel assemblies, wherein each of said plurality of wheel assemblies is coupled to a different one of the plurality of posts.

* * * * *